United States Patent
Li et al.

(10) Patent No.: US 7,524,898 B2
(45) Date of Patent: Apr. 28, 2009

(54) THERMOPLASTIC MOLDING COMPOSITION HAVING IMPROVED TOUGHNESS AT LOW TEMPERATURES AND SURFACE APPEARANCE

(75) Inventors: Xiangyang Li, Seven Fields, PA (US); Pierre R. Moulinie, Leverkusen (DE); James P. Mason, Carnegie, PA (US)

(73) Assignee: Bayer MaterialScience LLC, Pittsburgh, PA (US)

( * ) Notice: Subject to any disclaimer, the term of this patent is extended or adjusted under 35 U.S.C. 154(b) by 89 days.

(21) Appl. No.: 11/607,682

(22) Filed: Dec. 1, 2006

(65) Prior Publication Data

US 2008/0132641 A1 Jun. 5, 2008

(51) Int. Cl.
  *C08L 51/04* (2006.01)
(52) U.S. Cl. .......................... 525/67; 525/69
(58) Field of Classification Search ................... 525/63, 525/67, 69
  See application file for complete search history.

(56) References Cited

U.S. PATENT DOCUMENTS

| | | | |
|---|---|---|---|
| 4,554,315 A | 11/1985 | Chung et al. | 525/67 |
| 4,877,835 A | 10/1989 | Tsuda et al. | 525/67 |
| 4,888,388 A | 12/1989 | Hongo et al. | 525/67 |
| 5,082,897 A | 1/1992 | Udipi | 525/67 |
| 5,104,934 A | 4/1992 | Udipi | 525/67 |
| 5,674,928 A | 10/1997 | Chisholm et al. | 524/147 |
| 6,545,089 B1 * | 4/2003 | DeRudder et al. | 525/63 |
| 6,989,190 B2 | 1/2006 | Gaggar et al. | 428/220 |
| 7,067,567 B2 | 6/2006 | Seidel et al. | 523/201 |

FOREIGN PATENT DOCUMENTS

| | | |
|---|---|---|
| EP | 0 299 469 A2 | 1/1989 |
| EP | 0 787 769 A2 | 8/1997 |
| EP | 0 900 827 A2 | 3/1999 |
| JP | 2001-31860 | 2/2001 |
| WO | 01/64789 A2 | 9/2001 |

* cited by examiner

*Primary Examiner*—Jeffrey C Mullis
(74) *Attorney, Agent, or Firm*—Noland J. Cheung; John E. Mrozinski, Jr.

(57) ABSTRACT

A thermoplastic molding composition containing polycarbonate, polyalkylene terephthalate and an elastomeric impact modifier is disclosed. The impact modifier that exhibits pH value of less than 7 and contains less than 500 ppm of sodium ions, is characterized in its core/shell morphology, where the core contains polymerized butadiene structural units and shell contains polymerized methacrylate structural units. The core is present in an amount of 40 to 70 percent relative to the weight of the impact modifier, and the glass transition temperature of the shell is greater than 23° C. The composition is characterized in its improved surface quality and toughness at low temperatures.

11 Claims, No Drawings

THERMOPLASTIC MOLDING COMPOSITION HAVING IMPROVED TOUGHNESS AT LOW TEMPERATURES AND SURFACE APPEARANCE

FIELD OF THE INVENTION

The invention is directed to a thermoplastic molding composition and in particular to an impact modified polycarbonate composition.

BACKGROUND OF THE INVENTION

Thermoplastic compositions containing aromatic polycarbonate, polyalkylene terephthalate and an elastomeric impact modifier are known and available commercially. The impact modifiers thus suitable include acrylonitrile-butadiene-styrene copolymer (ABS) or methyl methacrylate-butadiene-styrene copolymer (MBS).

The published art is noted to include U.S. Pat. Nos. 5,104,934 and 5,082,897 that disclosed thermoplastic molding compositions containing polycarbonate, polyesters and ABS or ASA (acrylate-styrene-acrylonitrile). These compositions are said to exhibit enhanced moldability, heat resistance and thick section impact resistance. Also relevant is U.S. Pat. No. 4,554,315 that disclosed a thermoplastic molding composition containing polyester resin, polycarbonate resin, and a graft polymer based on conjugated diene or acrylate rubber and includes a grafted phase that may include methacrylic ester and styrene.

U.S. Pat. No. 4,877,835 disclosed a thermoplastic resin composition containing a rubber-modified styrene thermoplastic resin, an aromatic polyester, and aromatic polycarbonate. Included among the rubber modified styrene thermoplastic resin is methylmethacrylate-butadiene-styrene resin.

U.S. Pat. No. 4,888,388 disclosed an impact resistant thermoplastic composition having distinguished surface appearance, color and thermal stability. The composition contains a graft rubber copolymer, polycarbonate and saturated polyester.

U.S. Pat. No. 5,674,928 disclosed a thermoplastic resin composition containing a polyester resin, a polycarbonate resin and a graft copolymer containing a rubbery substrate and a rigid superstrate. Methylmethacrylate-butadiene-styrene graft copolymers are among the disclosed graft copolymer.

JP 2001 031 860 disclosed a composition containing polycarbonate, a mixture of polyethylene terephthalate and polybutylene terephthalate and a graft elastomer having a core-shell structure. The composition said to exhibit high impact strength, hydrolytic stability and chemical resistance.

An impact modified thermoplastic molding composition containing polycarbonate, polyalkylene terephthalate and a graft (co)polymer has been disclosed in U.S. Pat. No. 7,067,567. The graft (co)polymer is exemplified by methyl methacrylate-grafted silicone-butyl acrylate composite rubber. U.S. Pat. No. 6,989,190 disclosed a blend of polycarbonate, cycloaliphatic polyester resin and an impact modifier that contains a MBS core-shell polymer.

Among the objectives of the present invention was the development of a thermoplastic composition that features good mechanical properties and surface appearance.

SUMMARY OF THE INVENTION

A thermoplastic molding composition containing polycarbonate, polyalkylene terephthalate and an elastomeric impact modifier is disclosed. The impact modifier that exhibits pH value of less than 7 and contains less than 500 ppm of sodium ions, is characterized in its core/shell morphology, where the core contains polymerized butadiene structural units and shell contains polymerized methacrylate structural units. If styrene structural units are present in the core, the weight ratio of methacrylate in the shell to styrene in the core is greater than 1.5. The core is present in an amount of 40 to 70 percent relative to the weight of the impact modifier, and the glass transition temperature of the shell is greater than 23° C. The composition is characterized in its improved surface quality and toughness at low temperatures.

DETAILED DESCRIPTION OF THE INVENTION

The thermoplastic molding composition of the invention contains 25 to 95, preferably 40 to 80 part by weight (pbw) polycarbonate, 5 to 75 preferably 20 to 60 pbw polyalkylene terephthalate, and an impact modifier in an amount of 1 to 40 preferably 5 to 20 percent relative to the total weight of polycarbonate and polyalkylene terephthalate. The composition is characterized its by its impact strength and low temperatures and by its good surface appearance.

(A) Aromatic Polycarbonate

The term aromatic polycarbonates as used in the present context, refers generically to homopolycarbonates, and to copolycarbonates, including polyestercarbonates. These materials are well known and are available in commerce.

Aromatic polycarbonates may be prepared by known processes including melt transesterification process and interfacial polycondensation process (see for instance Schnell's "Chemistry and Physics of Polycarbonates", Interscience Publishers, 1964) and are widely available in commerce, for instance under the trademark Makrolon® from Bayer MaterialScience.

Aromatic dihydroxy compounds suitable for the preparation of aromatic polycarbonates conform to formula (I)

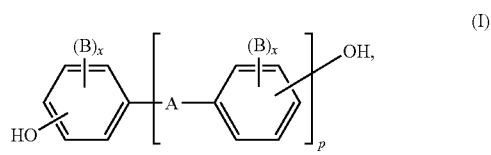

wherein

A represents a single bond, $C_1$- to $C_5$-alkylene, $C_2$- to $C_5$-alkylidene, $C_5$- to $C_6$-cycloalkylidene, —O—, —SO—, —CO—, —S—, —$SO_2$—, $C_6$- to $C_{12}$-arylene, to which there may be condensed other aromatic rings optionally containing hetero atoms, or a radical conforming to formula (II) or (III)

-continued

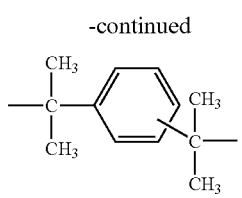
(III)

The substituents B independently one of the others denote $C_1$- to $C_{12}$-alkyl, preferably methyl, x independently one of the others denote 0, 1 or 2, p represents 1 or 0, and $R^5$ and $R^6$ are selected individually for each $X^1$ and each independently of the other denote hydrogen or $C_1$- to $C_6$-alkyl, preferably hydrogen, methyl or ethyl, $X^1$ represents carbon, and m represents an integer of 4 to 7, preferably 4 or 5, with the proviso that on at least one atom $X^1$, $R^5$ and $R^6$ are both alkyl groups.

Preferred aromatic dihydroxy compounds are hydroquinone, resorcinol, dihydroxydiphenols, bis-(hydroxyphenyl)-$C_1$-$C_5$-alkanes, bis-(hydroxyphenyl)-$C_5$-$C_6$-cycloalkanes, bis-(hydroxyphenyl)ethers, bis-(hydroxyphenyl) sulfoxides, bis-(hydroxyphenyl)ketones, bis-(hydroxyphenyl)-sulfones and α,α-bis-(hydroxyphenyl)-diisopropylbenzenes. Particularly preferred aromatic dihydroxy compounds are 4,4'-dihydroxydiphenyl, bisphenol A, 2,2-bis-(4-hydroxyphenyl)-2-methylbutane, 1,1-bis-(4-hydroxyphenyl)-cyclohexane, 1,1-bis-(4-hydroxyphenyl)-3,3,5-trimethylcyclohexane, 4,4'-dihydroxydiphenyl sulfide, 4,4'-dihydroxydiphenyl-sulfone. Special preference is given to 2,2-bis-(4-hydroxyphenyl)-propane (bisphenol A). These compounds may be used singly or as mixtures containing two or more aromatic dihydroxy compounds.

Chain terminators suitable for the preparation of polycarbonates include phenol, p-chlorophenol, p-tert.-butylphenol, as well as long-chained alkylphenols, such as 4-(1,3-tetramethylbutyl)-phenol or monoalkylphenols or dialkylphenols having a total of from 8 to 20 carbon atoms in the alkyl substituents, such as 3,5-di-tert.-butylphenol, p-isooctylphenol, p-tert.-octylphenol, p-dodecylphenol and 2-(3,5-dimethylheptyl)-phenol and 4-(3,5-dimethylheptyl)-phenol. The amount of chain terminators to be used is generally 0.5 to 10% based on the total molar amount of the aromatic dihydroxy compounds used.

Polycarbonates may be branched in a known manner, preferably by the incorporation of 0.05 to 2.0%, based on the molar amount of the aromatic dihydroxy compounds used, of compounds having a functionality of three or more, for example compounds having three or more phenolic groups. Aromatic polyestercarbonates are known. Suitable such resins are disclosed in U.S. Pat. Nos. 4,334,053: 6,566,428 and in CA1173998, all incorporated herein by reference.

Aromatic dicarboxylic acid dihalides for the preparation of aromatic polyester carbonates include diacid dichlorides of isophthalic acid, terephthalic acid, diphenyl ether 4,4'-dicarboxylic acid and naphthalene-2,6-dicarboxylic acid. Particularly preferred are mixtures of diacid dichlorides of isophthalic acid and terephthalic acid in a ratio of from 1:20 to 20:1. Branching agents may also be used in the preparation of suitable polyestercarbonates, for example, carboxylic acid chlorides having a functionality of three or more, such as trimesic acid trichloride, cyanuric acid trichloride, 3,3'-,4,4'-benzophenonetetracarboxylic acid tetrachloride, 1,4,5,8-naphthalenetetracarboxylic acid tetrachloride or pyromellitic acid tetrachloride, in amounts of 0.01 to 1.0 mol. % (based on dicarboxylic acid dichlorides used), or phenols having a functionality of three or more, such as phloroglucinol, 4,6-dimethyl-2,4,6-tri-(4-hydroxyphenyl)-heptene-2,4,4-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenylmethane, 2,2-bis[4,4-bis(4-hydroxyphenyl)-cyclohexyl]-propane, 2,4-bis(4-hydroxyphenyl-isopropyl)-phenol, tetra-(4-hydroxyphenyl)-methane, 2,6-bis(2-hydroxy-5-methyl-benzyl)-4-methylphenol, 2-(4-hydroxyphenyl)-2-(2,4-dihydroxyphenyl)-propane, tetra-(4-[4-hydroxyphenyl-isopropyl]-phenoxy)-methane, 1,4-bis[4,4'-dihydroxytriphenyl)-methyl]-benzene, in amounts of from 0.01 to 1.0 mol. %, based on diphenols used. Phenolic branching agents can be placed in the reaction vessel with the diphenols, acid chloride branching agents may be introduced together with the acid dichlorides.

The content of carbonate structural units in the polyestercarbonates may be up to 99 mol. %, especially up to 80 mol. %, particularly preferably up to 50 mol. %, based on the sum of ester groups and carbonate groups. Both the esters and the carbonates contained in the polyestercarbonates may be present in the polycondensation product in the form of blocks or in a randomly distributed manner.

The preferred polycarbonates have weight-average molecular weights (measured by gel permeation chromatography) of at least 25,000, more preferably at least 26,000. Preferably these have maximum weight-average molecular weight of 80,000, more preferably up to 70,000, particularly preferably up to 50,000 g/mol.

Suitable polycarbonate resins are available, for instance under the Makrolon trademark from Bayer MaterialScience LLC of Pittsburgh, Pa. and from Bayer MaterialScience AG of Leverkusen, Germany.

(B) Polyalkylene terephthalate

The (polyalkylene terephthalate suitable in the present context include homo-polymeric and copolymeric resins, the molecular structure of which include at least one bond derived from a carboxylic acid, preferably excluding linkages derived from carbonic acid. These are known resins and may be prepared through condensation or ester interchange polymerization of the diol component with the diacid according to known methods. Examples are esters derived from the condensation of a cyclohexanedimethanol with an ethylene glycol with a terephthalic acid or with a combination of terephthalic acid and isophthalic acid. Also suitable are polyesters derived from the condensation of a cyclohexanedimethanol with an ethylene glycol with a 1,4-Cyclohexanedicarboxylic acid. Suitable resins include poly(alkylene dicarboxylates), especially poly(ethylene terephthalate) (PET), poly(1,4-butylene terephthalate) (PBT), poly(trimethylene terephthalate) (PTT), poly(ethylene naphthalate) (PEN), poly(butylenes naphthalate) (PBN), poly(cyclohexanedimethanol terephthalate) (PCT), poly(cyclohexanedimethanol-co-ethylene terephthalate) (PETG or PCTG), and poly(1,4-cyclohexanedimethyl-1,4-cyclohexanedicarboxylate) (PCCD).

U.S. Pat. Nos. 2,465,319; 3,953,394 and 3,047,539—all incorporated herein by reference, disclose suitable methods for preparing such resins. The suitable polyalkylene terephthalates are characterized by an intrinsic viscosity of at least 0.2 and preferably about at least 0.4 deciliter/gram as measured by the relative viscosity of an 8% solution in orthochlorophenol at about 25° C. The upper limit is not critical but it generally does not exceed about 2.5 deciliters/gram. Especially preferred polyalkylene terephthalates are those with an intrinsic viscosity in the range of 0.4 to 1.3 deciliter/gram.

The alkylene units of the polyalkylene terephthalates which are suitable for use in the present invention contain from 2 to 5, preferably 2 to 4 carbon atoms. Polybutylene terephthalate (prepared from 1,4-butanediol) and polyethylene terephthalate are the preferred polyalkylene tetraphthalates for use in the present invention. Other suitable polyalkylene terephthalates include polypropylene terephthalate, polyisobutylene terephthalate, polypentyl terephthalate, polyisopentyl terephthalate, and polyneopentyl terephthalate. The alkylene units may be straight chains or branched chains.

The preferred polyalkylene terephthalates may contain, in addition to terephthalic acid groups, up to 20 mol % of groups from other aromatic dicarboxylic acids with 8 to 14 carbon atoms or aliphatic dicarboxylic acids with 4 to 12 carbon atoms, such as groups from phthalic acid, isophthalic acid, naphthalene-2,6-dicarboxylic acid, 4,4'-di-phenyl-dicarboxylic acid, succinic, adipic, sebacic, azelaic acids or cyclohexanediacetic acid.

The preferred polyalkylene terephthalates may contain, in addition to ethylene glycol or butanediol-1,4-groups, up to 20 mol % of other aliphatic diols with 3 to 12 carbon atoms or cylcoaliphatic diols with 6 to 21 carbon atoms, e.g. groups from propanediol-1,3,2-ethylpropanediol-1,3, neopentyl glycol, pentanediol-1,5, hexanediol-1,6, cyclohexane-dimethanol-1,4,3-methylpentanediol-2,4,2-methyl-pentanediol-2,4, 2,2,4-trimethylpentanediol-1,3, and -1,6,2-ethylhexanediol-1,3,2,2-diethylpropanediol-1,3, hexanediol-2,5,1,4-di-(β-hydroxyethoxy)-benzene, 2,2-bis-(4-hydroxycyclohexyl)-propane, 2,4-dihydroxy-1,1,3,3-tetra-methyl-cyclobutane, 2,2-bis-(3-β-hydroxyethoxyphenyl)-propane and 2,2-bis-(4-hydroxypropoxyphenyl)-propane (DE-OS 24 07 674, 24 07 776, 27 15 932).

The polyalkylene terephthalates may be branched by incorporating small amounts of 3- or 4-hydric alcohols or 3- or 4-basic carboxylic acids, such as are described, for example, in DE-OS 1,900,270 and U.S. Pat. No. 3,692,744. Examples of preferred branching agents include trimesic acid, trimellitic acid, trimethylol-ethane and -propane and pentaerythritol. Preferably no more than 1 mol % of branching agent, with respect to the acid component, is used.

Polyalkylene terephthalates prepared solely from terephthalic acid and its reactive derivatives (e.g. its diallyl esters) and ethylene glycol and/or butanediol-1,4 (polyethyleneterephthalate and polybutyleneterephthalate) and mixtures of these polyalkylene terephthalates are particularly preferred. Copolyesters prepared from at least two of the acid components mentioned above and/or at least two of the alcohol components mentioned above are also preferred. Polyalkylene-terephthalates, poly(ethylene glycol/butanediol-1,4)-terephthalates being particularly preferred copolyesters.

Suitable polyalkylene terephthalates have been disclosed in U.S. Pat. Nos. 4,267,096; 4,786,692; 4,352,907; 4,391, 954; 4,125,571; 4,125,572; 4,188,314 and 5,407,994 the disclosures of which are incorporated herein by reference.

(C) Impact Modifier

Component (C) is an impact modifier having core/shell morphology characterized in that its crosslinked elastomeric core contains (co)polymerized butadiene, its grafted shell, having glass transition temperature greater than 23°, preferably greater than 80°, most preferably greater than 90° C., contains (co)polymethacrylate, its rubber content is about 40 to 70, preferably 50 to 70, most preferably 60 to 70 percent by weight relative to the weight of the impact modifier, its sodium ion content is less than 500 ppm, preferably 1 to 400, more preferably 2 to 100 ppm and its pH is less than 7, preferably 4 to 7. The elastomeric core may contain butadiene copolymerized with one or more vinyl monomers, preferably vinyl monomers having 3 to 12 carbon atoms, exemplified by styrene and methyl styrene provided that in embodiments where the core contains copolymerized styrene, the weight ratio of methacrylate in the shell to styrene is not less than 1.5. Compositionally the shell contains polymerized methacrylate, preferably methyl methacrylate, optionally copolymerized with at least one vinyl comonomer, preferably styrene.

The volume average particle size (determined by transmission electron microscopy image analysis) is 10 nm to 2 microns. The particle size distribution may be monomodal, bimodal, or polymodal. In a preferred embodiment, the particle size distribution is bimodal, peaking at 50 nm and 550 nm.

The pH of the impact modifier is determined by measuring the pH of deionized water (100 mL) in which 5 grams of an impact modifier was stirred for 40 hours at room temperature.

Rubber modifiers suitable in the context of the inventive composition may be prepared by emulsion, suspension, bulk, solution or combined polymerization processes such as bulk-suspension, emulsion-bulk, bulk-solution. These processes may be continuous, batch, or semi-continuous. Suitable procedures are described in U.S. Pat. Nos. 5,451,624 and 5,534, 594, incorporated herein by reference.

The inventive composition may further include additives that are known for their function in the context of thermoplastic compositions that contain polycarbonates or polyalkylene terephthalate. These include any one or more of lubricants, mold release agents, for example pentaerythritol tetrastearate, nucleating agents, antistatic agents, thermal stabilizers, light stabilizers, hydrolytic stabilizers, fillers and reinforcing agents, colorants or pigments, flame retarding agents and drip suppressants.

Conventional equipment and conventional procedures may be used in the preparation of the inventive composition.

The inventive composition may be used to produce moldings of any kind by thermoplastic processes such as injection molding, extrusion and blow molding methods.

EXAMPLES 1-7

Compositions in accordance with the invention were prepared and their properties determined. In the preparation of the compositions which are described below the components were as follows:

Polycarbonate 1: a homopolycarbonate based on bisphenol-A (Makrolon 3108 polycarbonate) characterized in that its melt flow rate per ASTM D-1238 (300° C. –1200 g load) is about 6.5 gm/10 min.

Polycarbonate 2: a homopolycarbonate based on bisphenol-A (Makrolon 2608 polycarbonate) characterized in that its melt flow rate per ASTM D-1238 (300° C. –1200 g load) is about 13 gm/10 min.

PET 1: Polyethylene terephthalate characterized in its intrinsic viscosity of 0.94

PET 2: Polyethylene terephthalate characterized in its intrinsic viscosity of 0.6

Impact modifiers: The table below describes the makeup of the impact modifiers included in the exemplified compositions. These impact modifiers have core/shell structure containing polymethyl methacrylate and, optionally styrene, in the shell, and polybutadiene or copolybutadiene in the core. Impact modifier 3 represents the present invention; all others are comparative impact modifiers.

| Impact modifier | Na (ppm) | K (ppm) | Si (ppm) | Ca (ppm) | MMA (%) | BD (%) | Sty (%) | pH |
|---|---|---|---|---|---|---|---|---|
| Impact modifier 1 | 1800 | 621 | 468 | <10 | 19 | 65 | 16 | 6.7 |
| Impact modifier 2 | 2845 | 16 | 566 | 18.5 | 19 | 66 | 15 | 6.4 |
| Impact modifier 3 | 325 | 75 | 719.5 | <10 | 28 | 63 | 9 | 4.7 |
| Impact modifier 4 | 41 | 70 | 4300 | <1 | 21 | 73 | 6 | 4.8 |
| Impact modifier 5 | 130 | 9.7 | <10 | <1 | 20 | 80 | 0 | 5.4 |

In the preparation of exemplified compositions, the components and additives were melt compounded in a twin screw extruder ZSK 30 (temperature profile 120 to 255° C.) The pellets obtained were dried in a forced-air convection oven at 110-120° C. for 4 to 6 hours. Parts were injection molded (melt temperature 265 to 285° C., mold temperature about 75° C.).

The determination of Izod impact strength was carried out using specimens 1/8" or 1/4" in thickness. Measurements were in accordance with ASTM D-256.

Each of compositions 1, 2, 3, and 4 further contained the same additive amounts of a thermal stabilizer and each of compositions 5, 6 and 7 further contained the same additive amounts of a UV absorber, neither additive having criticality in the present context. The compositions were processed and molded conventionally and their properties are shown in Table 1.

TABLE 1

|  | 1 | 2 | 3 | 4 | 5 | 6 | 7 |
|---|---|---|---|---|---|---|---|
| Polycarbonate 1 | 71.6 | 71.6 | 71.6 | 71.6 |  |  |  |
| Polycarbonate 2 |  |  |  |  | 56.2 | 56.2 | 56.2 |
| PET 1 | 18 | 18 | 18 | 18 |  |  |  |
| PET 2 |  |  |  |  | 37.05 | 37.05 | 37.05 |
| Impact modifier 1 | 10 |  |  |  | 6 |  |  |
| Impact Modifier 2 |  | 10 |  |  |  | 6 |  |
| Impact Modifier 3 |  |  | 10 |  |  |  | 6 |
| Impact Modifier 4 |  |  |  | 10 |  |  |  |
| Impact strength, notched Izod ft-lb/in |  |  |  |  |  |  |  |
| 1/4" @ -30° C. | 3.36 | 8.05 | 11.58 | 9.3 | — | — | — |
| 1/4" @ -40° C. | 3.05 | 5.1 | 9.9 | 5.6 | — | — | — |
| 1/8" @ -30° C. | — | — | — | — | 1.39 | 1.66 | 4.26 |

EXAMPLES 8-10

Further compositions were prepared as described below and evaluated.

Polycarbonate 3: a homopolycarbonate based on bisphenol-A (Makrolon 2405 polycarbonate) characterized in that its melt flow rate per ASTM D-1 238 (300° C. −1200 g load) is about 20 gm/10 min.

Each of compositions 8, 9 and 10 further contained the same additive amounts of a thermal stabilizer, UV absorber and carbon black having no criticality in the present context.

The compositions were processed and molded conventionally and their properties are shown in Table 2.

TABLE 2

|  | 8 | 9 | 10 |
|---|---|---|---|
| Polycarbonate 3 | 78 | 78 | 78 |
| PET 1 | 22 | 22 | 22 |
| Impact modifier 1 | 5 |  |  |
| Impact modifier 2 |  | 5 |  |
| Impact modifier 3 |  |  | 5 |
| Impact strength, notched Izod ft-lb/in, 1/8" @ −20° C. | 4.24 | 3.38 | 5.66 |
| Surface quality | Severe defects | Severe defects | Good |

EXAMPLES 11 AND 12

Further compositions were prepared as described below and evaluated.

Polycarbonate 4: a homopolycarbonate based on bisphenol-A (Makrolon 2808 polycarbonate) characterized in that its melt flow rate per ASTM D-1238 (300° C. −1200 g load) is about 10 gm/10 min.

PBT: Polybutylene terephthalate (PBT), a product of Lanxess Corporation, available under the trademark Pocan B1300

PMX: a pre-mix containing equal amounts (38.2%) of powdered PBT and polycarbonate; 9.1% KU3-2213; 9.2% Black Pearls 800; 3.0% Irgafos 168. KU3-2213 is a transesterification quencher, Black Pearls 800 is a carbon black, Irgafos 168 is a thermal stabilizer. The PMX has no criticality in the present context.

The compositions were processed and molded conventionally and their properties are shown in Table 3.

TABLE 3

|  | Example | |
|---|---|---|
|  | 11 | 12 |
| Polycarbonate 4 | 41.76 | 41.76 |
| PBT | 41.76 | 41.76 |
| Impact modifier 5 | 9.94 | — |
| Impact modifier 3 | — | 9.94 |
| PMX | 6.54 | 6.54 |
| Impact strength, notched Izod, kJ/m², 3.2 mm @ 25° C.* | 33.26 | 55.93 |
| Impact strength, notched Izod, kJ/m², 3.2 mm @ 0° C.* | 38.29 | 44.03 |

*The notched Izod impact strength was tested according to ISO 180-A

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A thermoplastic molding composition comprising
   (a) polycarbonate,
   (b) polyalkylene terephthalate and
   (c) impact modifier exhibiting pH value of less than 7, a bimodal particle size distribution peaking at 50 nm and 550 nm and containing 1 to 500 ppm of sodium ions, characterized in its core/shell morphology, wherein the core contains polymerized butadiene structural units and shell contains polymerized methacrylate structural units, said core is present in an amount of 40 to 70 percent relative to the weight of the impact modifier, said shell having glass transition temperature greater than 23° C. excluding an impact modifier of which core contains copolymerized styrene where the weight ratio of methacrylate to said styrene is less than 1.5.

2. The composition of claim 1, wherein the polycarbonate is present in an amount of 25 to 95 (pbw), the polyalkylene terephthalate is present in an amount of 5 to 75 pbw and the impact modifier is present in an amount of 1 to 40 percent relative to the total weight of polycarbonate and polyalkylene terephthalate.

3. The composition of claim 1, wherein the polycarbonate is present in an amount of 40 to 80 pbw, the polyalkylene terephthalate is present in an amount of 20 to 60 pbw and the impact modifier is present in an amount of 5 to 20 percent relative to the total weight of polycarbonate and polyalkylene terephthalate.

4. The composition of claim 1, wherein the polyalkylene terephthalate is polyethylene terephthalate.

5. The composition of claim 1, wherein the polyalkylene terephthalate is polybutylene terephthalate.

6. The composition in claim 1, wherein the impact modifier has a volume average particle size of 10 nm to 2 microns.

7. The composition of claim 1, wherein the glass transition temperature is greater than 80° C.

8. The composition of claim 1, wherein the core is present in an amount of 50 to 70 percent by weight relative to the weight of the impact modifier.

9. The composition of claim 1, wherein said sodium ion content is 1 to 400 ppm.

10. The composition of claim 1, wherein the elastomeric core contains butadiene copolymerized with at least one vinyl monomer.

11. The composition of claim 10 wherein the vinyl monomer is styrene.

* * * * *